(12) United States Patent
Abernethy, Jr. et al.

(10) Patent No.: US 8,311,211 B2
(45) Date of Patent: Nov. 13, 2012

(54) PROVIDING CPU SMOOTHING OF CRYPTOGRAPHIC FUNCTION TIMINGS

(75) Inventors: Michael Negley Abernethy, Jr., Pflugerville, TX (US); Kulvir Singh Bhogal, Fort Worth, TX (US); Travis M. Grigsby, Austin, TX (US); Robert Norris-Lance Krentler, Austin, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/049,292

(22) Filed: Mar. 15, 2008

(65) Prior Publication Data
US 2008/0162979 A1    Jul. 3, 2008

Related U.S. Application Data (63) Continuation of application No. 11/355,659, filed on Feb. 16, 2006, now abandoned.

(51) Int. Cl.
*G06F 21/00* (2006.01)

(52) U.S. Cl. ............... 380/1; 380/28; 380/29; 713/400; 713/500

(58) Field of Classification Search ............. 713/188, 713/400, 401, 500, 501, 600; 380/1, 28, 380/29, 30
See application file for complete search history.

(56) References Cited

U.S. PATENT DOCUMENTS

| | | | |
|---|---|---|---|
| 4,587,612 A | 5/1986 | Fisk et al. | 703/26 |
| 6,381,558 B1 | 4/2002 | Berry et al. | 702/186 |
| 6,754,349 B1 | 6/2004 | Arthan | 380/286 |
| 6,819,766 B1 | 11/2004 | Weidong | 380/277 |
| 7,321,958 B2 | 1/2008 | Hofstee et al. | 711/153 |
| 2004/0062391 A1 | 4/2004 | Tsunoo | 380/42 |
| 2004/0128575 A1 | 7/2004 | Schmidt | 713/322 |
| 2004/0133794 A1* | 7/2004 | Kocher et al. | 713/193 |
| 2005/0031121 A1* | 2/2005 | Lee | 380/28 |
| 2005/0034002 A1 | 2/2005 | Flautner | 713/322 |

(Continued)

FOREIGN PATENT DOCUMENTS

JP    2005086670 A    3/2005

OTHER PUBLICATIONS

Kocher, P. "Timing Attacks on Implementations of Diffie-Hellman, RSA, DSS and Other Systems." in: Koblitz, N., Advances in Cryptology—Crypto '96 (Berlin, Springer, 1996), pp. 104-113.*

(Continued)

*Primary Examiner* — Justin T Darrow
(74) *Attorney, Agent, or Firm* — VanLeeuwen & VanLeeuwen; Jeffrey S. LaBaw (57) ABSTRACT

An approach that smoothes a cryptographic function's timing footprint is presented. A processor includes a "function timing smoother" that smoothes out spikes in the amount of time that a particular cryptographic function requires to execute. When a cryptographic function executes, the function timing smoother tracks the amount of time that the cryptographic function executes (current execution time) and compares the time with the amount of time that the same cryptographic function took for a previous execution (previous execution time). When the current execution time is less than the previous execution time, the function timing smoother adds instructions or varies an execution unit's clock speed in order to increase the cryptographic function's current execution time. Using this approach, a malicious user is not able to decipher sensitive information from the cryptographic function's timing footprint.

14 Claims, 8 Drawing Sheets

U.S. PATENT DOCUMENTS

2006/0029224 A1* 2/2006 Baek et al. .................. 380/30
2007/0237326 A1 10/2007 Nonaka et al. .................. 380/37

OTHER PUBLICATIONS

Office Action for U.S. Appl. No. 11/355,659, mailed May 5, 2009, 13 pages.

Bernstein, "Cache-timing attacks on AES," 37 pages, Apr. 14, 2005.
Abbot, "Key Replacement by Transparent Transmission," IBM Research Disclosure, n. 446, Jun. 2001, Article 179, p. 1063.
Handschuh et al., "Selected areas in cryptography," 11$^{th}$ International Workshop, SAC 2004, Waterloo, Canada, Aug. 9-10, 2004, p. 227-240, copyright 2005.

* cited by examiner

PROVIDING CPU SMOOTHING OF CRYPTOGRAPHIC FUNCTION TIMINGS

RELATED APPLICATIONS

This application is a continuation application of U.S. Non-Provisional patent application Ser. No. 11/355,659, entitled "System and Method to Provide CPU Smoothing of Cryptographic Function Timings," filed on Feb. 16, 2006, now abandoned.

BACKGROUND OF THE INVENTION

1. Technical Field

The present invention relates to a system and method to provide CPU smoothing of cryptographic function timings.

More particularly, the present invention relates to a system and method to smooth a cryptographic function's "timing footprint" by injecting instructions and/or adjusting clock speed in order to prevent malicious attacks.

2. Description of the Related Art

Computer users have used techniques for protecting computer data from malicious attackers for many years. Before the Internet, a user was most concerned with a malicious attacker obtaining computer data by locating an unattended computer, and using the computer's keyboard or pointing device to retrieve data from its hard drive. In order to combat this threat, login password protection mechanisms were installed that required a user to enter a password in order to gain access to the computer. This approach prevented a malicious attacker from simply entering an area and retrieving data from the unattended computer.

The Internet has changed the entire data security landscape because a malicious attacker no longer needs to be present at the same location as the targeted computer. Rather, the malicious attacker may be in a different country than the target computer and extract the data through an Internet connection. Especially with the onset of e-commerce, a malicious attacker has much to gain by breaking into a user's computer. In turn, data protection mechanisms were put in place to prevent such attacks. However, malicious attack technology has become more sophisticated. Although high-speed Internet connections are a benefit to a user, the high-speed Internet connections also provide a mechanism for a malicious attacker to quickly break into a user's computer.

Therefore, as malicious attack technology becomes more sophisticated, attack prevention technology becomes more sophisticated. The Advanced Encryption Standard (AES) is the next generation standard for private key cryptography. AES scrambles a 16-byte input "n" using a 16-byte key "k" and two constant 256-byte tables. AES inserts n, k, and the 256 byte tables in various forms into arrays with array indexes in order to perform the encryption. A challenge found, however, is that it is extremely difficult to write constant-time high-speed AES software for use with a general-purpose processor. In particular, the underlying challenge is that it is extremely difficult to load an array entry in time that does not depend on the array entry's index.

It has been shown that the amount of time that an AES variable-index array lookup consumes, which is performed at the beginning of the AES computation, is dependent upon on the array index. Furthermore, the amount of time that is consumed for the entire AES computation is well correlated to the time for this array lookup. Consequently, these AES timing values "leak" information about the input "n" and the key "k." Therefore, a malicious attacker is able to deduce a key from the distribution of AES timings as a function of n. In short, a malicious attacker may monitor the amount of time that a processor requires to perform a cryptographic function, and deduce an encryption key and the data from the timing footprint.

What is needed, therefore, is a system and method to mask the amount of time that a processor requires to perform a cryptographic function in order to prevent malicious attacks.

SUMMARY

It has been discovered that the aforementioned challenges are resolved using a system and method to smooth a cryptographic function's timing footprint by injecting instructions and/or adjusting clock speed during the function's execution. A processor includes a "function timing smoother" that smoothes out spikes in the amount of time that a particular cryptographic function requires to execute. When a cryptographic function executes, the function timing smoother tracks the amount of time that the cryptographic function executes (current execution time) and compares the time with the amount of time that the same cryptographic function took during a previous execution (previous execution time). When the current execution time is less than the previous execution time, the function timing smoother adds instructions or varies an execution unit's clock speed in order to increase the cryptographic function's current execution time. Using this approach, a malicious attacker is not able to deduce sensitive information from the cryptographic function's timing footprint.

A developer develops application code and compiles the application code, which produces executable code and a symbol file. The developer modifies the symbol file and identifies cryptographic functions that are used in the executable code. In turn, the developer deploys the executable code and the modified symbol file (function identifier file) to a user. In one embodiment, a new keyword may be added to a programming language, such as "CryptographicFunction," which the developer may use to identify cryptographic functions by adding the keyword as a qualifier to the function.

In yet another embodiment, in the case of compiled byte code such as Java, the byte code includes symbol information. In this embodiment, a Java Virtual Machine (JVM) is positioned between the byte code and the processor, which performs further compilations from the Java byte code into the native operating system machine code that a processor executes. In this embodiment, the JVM retrieves the cryptographic function identification information included in the byte code and passes the information to the processor during the JVM's byte code compilation.

When a user receives the deployed code, the user loads the executable file and the function identifier file into a storage area. The user's computer includes a processor that includes an issue unit, an execution unit, and a function timing smoother. When the issue unit issues an instruction, the function timing smoother looks up the instruction (function) in the function identifier file to determine whether the instruction is a cryptographic function. When the instruction is a cryptographic function, the function timing smoother tracks and calculates the cryptographic function's "current execution time." In addition, the function timing smoother retrieves a "previous execution time" from a timing storage area, which corresponds to the amount of time that the cryptographic function required during a previous execution.

When the current execution time is less than the previous execution time, the function timing smoother configures a multiplexer and provides filler instructions (e.g. NOP equivalent instructions) to the execution unit, adding to the cryptographic function's current execution time, until the current execution time equals the previous execution time. By using the multiplexer and injecting instructions directly into the execution unit, the processor does not modify the executable code's code space or a code pointer corresponding to the executable code. The function timing smoother then stores the current execution time in the timing storage area, which becomes the "previous execution time" the next time the same cryptographic function executes.

In one embodiment, the function timing smoother adjusts the clock timing to the execution unit in order to increase a cryptographic function's current execution time. In this embodiment, the function timing smoother configures a clock multiplexer and provides a slower clock in order to prolong the amount of time that the cryptographic function takes to execute.

In another embodiment, instruction injections may be core independent. For example, on a device that includes four cores, each individual core independently smoothes the timings of their respective cryptographic functions. Consequently, the function timings may be smoothed to specific values on one core that are not the same smoothing values as the other cores.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
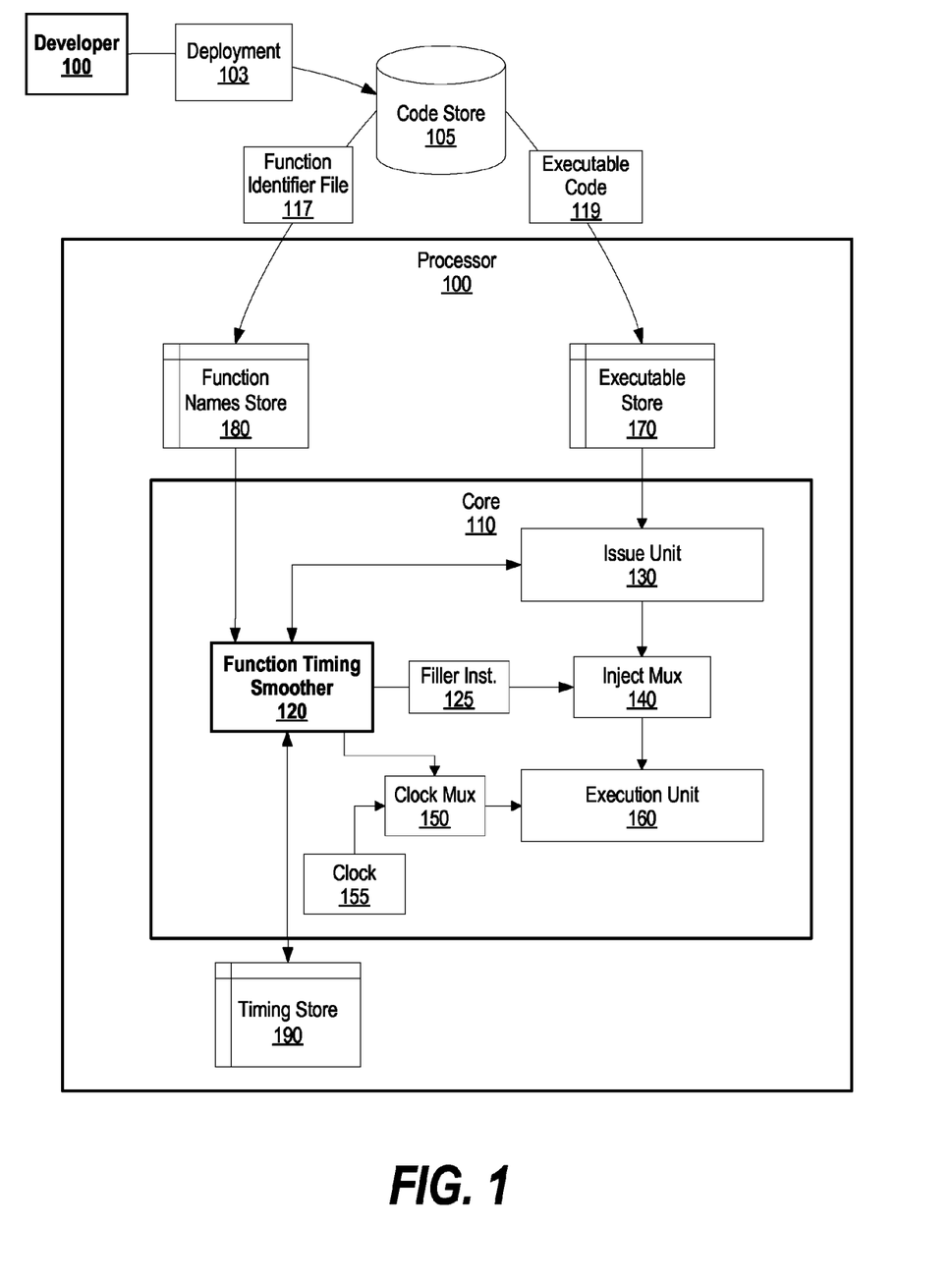
FIG. 1 is a diagram showing a function timing smoother that injects instructions and adjusts clock speed in order to smooth a cryptographic function's timing footprint.

FIG. 1 is a diagram showing a function timing smoother that injects instructions and adjusts clock speed in order to smooth a cryptographic function's timing footprint. Developer 100 develops and compiles code, which produces an executable file (executable code 119) and a "symbol" file. The developer modifies the symbol file to indicate the cryptographic function's (function identifier file 117) that are used in executable code 119. The developer deploys (deployment 103) executable code 119 and function identifier file 117 to a user, which the user stores in code store 115 (see FIG. 3 and corresponding text for further details regarding development and deployment). Code store 105 may be stored on a non-volatile storage area, such as a computer hard drive.

Once deployed to the user, the user's processor 100 loads executable code 119 into executable store 170 for execution, and loads function identifier file 117 into function names store 180. Function names store 180 and executable store 170 may be stored on a volatile storage area, such as computer memory. As one skilled in the art can appreciate, the invention described herein may be applied to smooth other function timing footprints besides cryptographic functions.

Core 110 includes issue unit 130, execution unit 160, and function timing smoother 120. Issue unit 130 may include multiple units (e.g., fetch unit, decode unit, etc.) that retrieve instructions from executable store 170 and stage the instructions for execution unit 160.

Execution unit 160 may include multiple units to execute instructions, such as an adder, a multiplier, etc.

Function timing smoother 120 monitors executable code 170 execution, and when a cryptographic function executes, function timing smoother 120 tracks the amount of time that the cryptographic function executes, such as 10 ms. The purpose of function timing smoother 120 is to smooth out spikes in the amount of time that a particular cryptographic function requires to execute (see FIGS. 2A and 2B for further details). In order to accomplish this task, function timing smoother 120 compares a cryptographic function's "current execution time" with a "previous execution time," and adds instructions or varies execution unit 160's clock speed if the current execution time is less than the previous execution time. Using this approach, a malicious user is not able to decipher sensitive information, such as an encryption key.

When issue unit 130 issues an instruction, function timing smoother 120 looks up the instruction (function) in function names store 180 to determine whether the instruction is a cryptographic instruction. When the instruction is a cryptographic instruction, function timing smoother 120 tracks and calculates the cryptographic function's current execution time. In turn, function timing smoother 120 retrieves a previous execution time from timing store 190, which corresponds to the amount of time that the cryptographic function required during a previous execution. Timing store 190 may be stored on a volatile storage area, such as computer memory.

If the "current execution time" is less than the "previous execution time," function timing smoother 120 configures multiplexer 140 and provides filler instructions 125 (e.g. NOP equivalent instructions) to execution unit 160, which adds to the cryptographic function's current execution time, until the current execution time equals the previous execution time. By using multiplexer 140, processing does not modify executable code 119's code space or a code pointer corresponding to executable code 119. Function timing smoother 120 then stores the current execution time in timing store 190, which becomes the "previous execution time" the next time the same cryptographic function executes.

In one embodiment, function timing smoother 120 adjusts the clock timing to execution unit 160 in order to increase a cryptographic function's current execution time.

Figure 6:
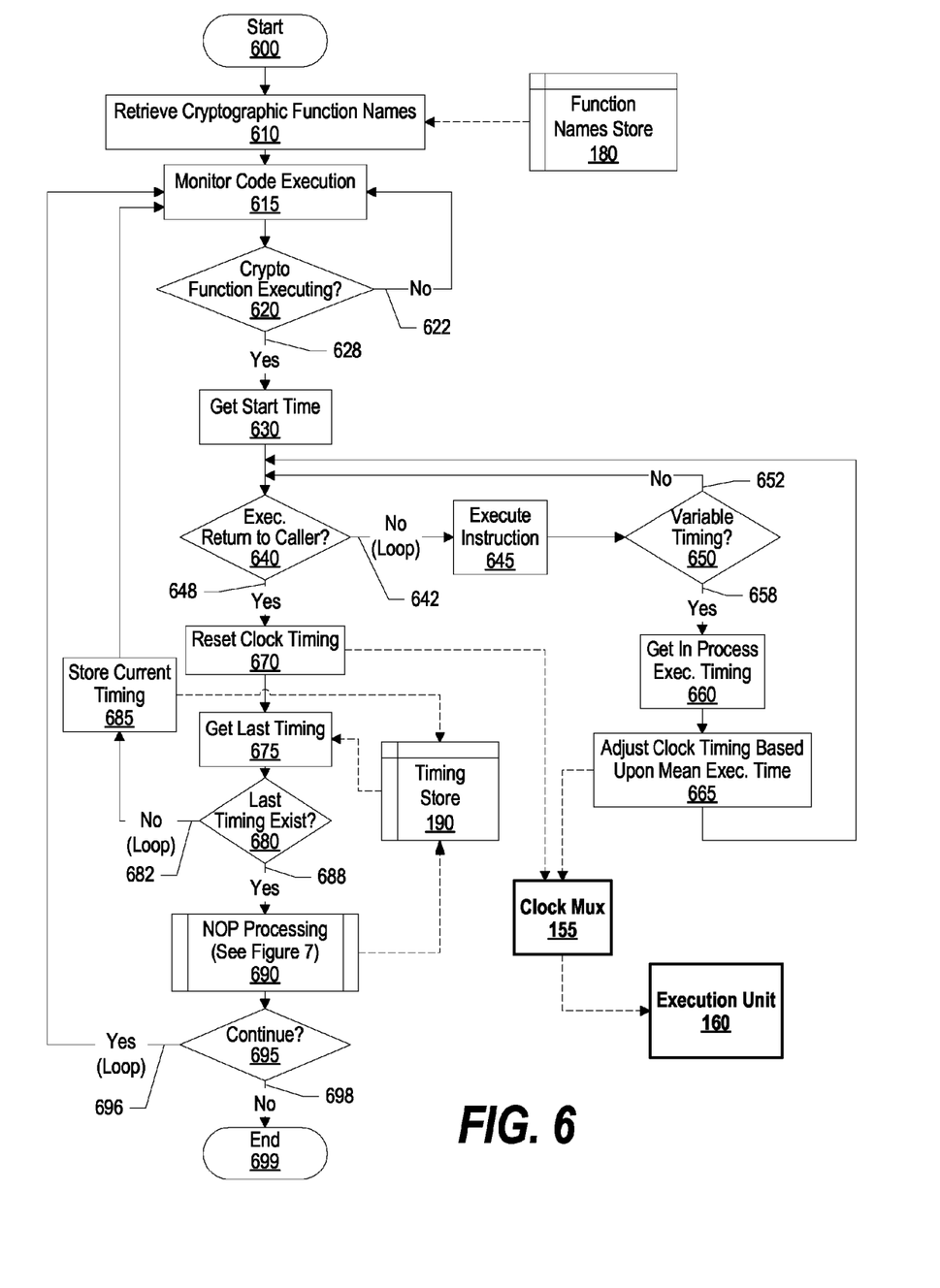
FIG. 6 is a flowchart showing steps taken in a function timing smoother injecting NOP instructions and adjusting clock speed in order to smooth cryptographic function timings.

In this embodiment, function timing smoother 120 configures clock multiplexer 150 and provides a slower clock in order to prolong the amount of time that the cryptographic function takes to execute (see FIG. 6 and corresponding text for further details).

In another embodiment, instruction injections may be core independent. For example, on a device that includes four cores, each individual core independently smoothes the timings of their respective cryptographic functions. Consequently, the timings may be smoothed to a specific maximum on one core that is not the same smoothing timing as another core.

Figure 2A:
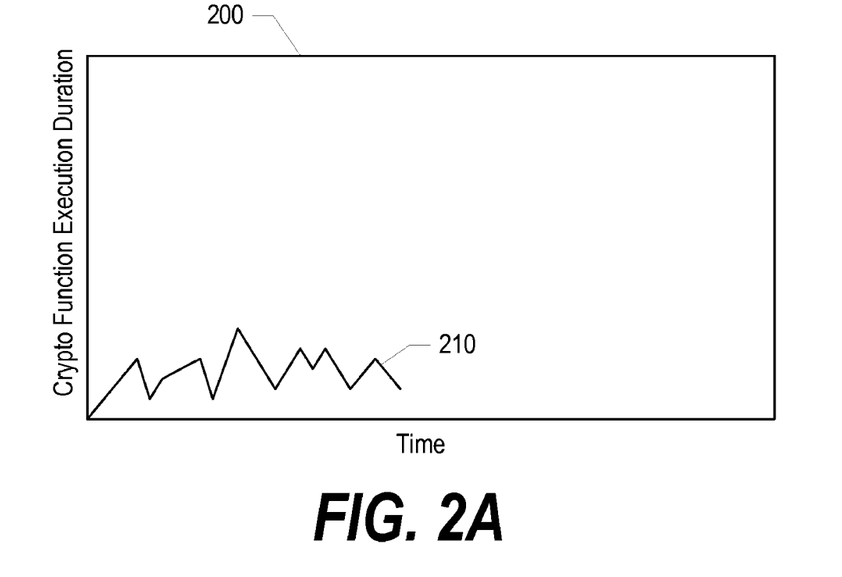
FIG. 2A is a diagram showing cryptographic function time durations without the invention described herein.

FIG. 2A is a diagram showing cryptographic function time durations without the invention described herein. Graph 200 shows that as a particular cryptographic function executes over a number of occurrences, the cryptographic function varies in the amount it takes to execute, which creates "footprint" 210 that a malicious user may use to decipher sensitive information as discussed in the background section.

Figure 2B:
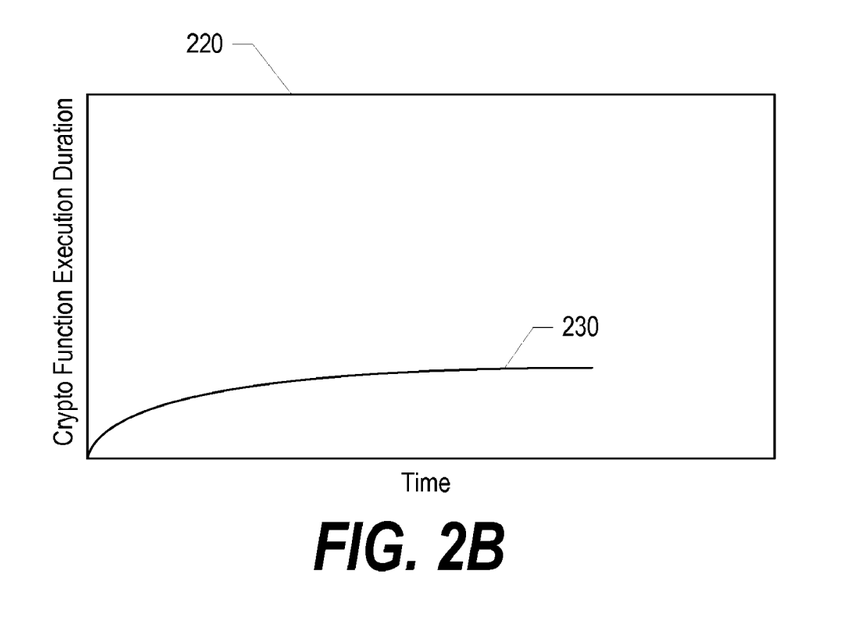
FIG. 2B is a diagram showing a smoothed execution time footprint using the invention described herein.

FIG. 2B is a diagram showing a smoothed execution time footprint using the invention described herein. Graph 220 includes footprint 230 that exhibit a cryptographic function's execution times being smoothed by adding instructions and/or varying the clock speed of an execution unit. As such, a malicious client is not able to decipher sensitive information from footprint 230, such as a cryptographic key.

Figure 3:
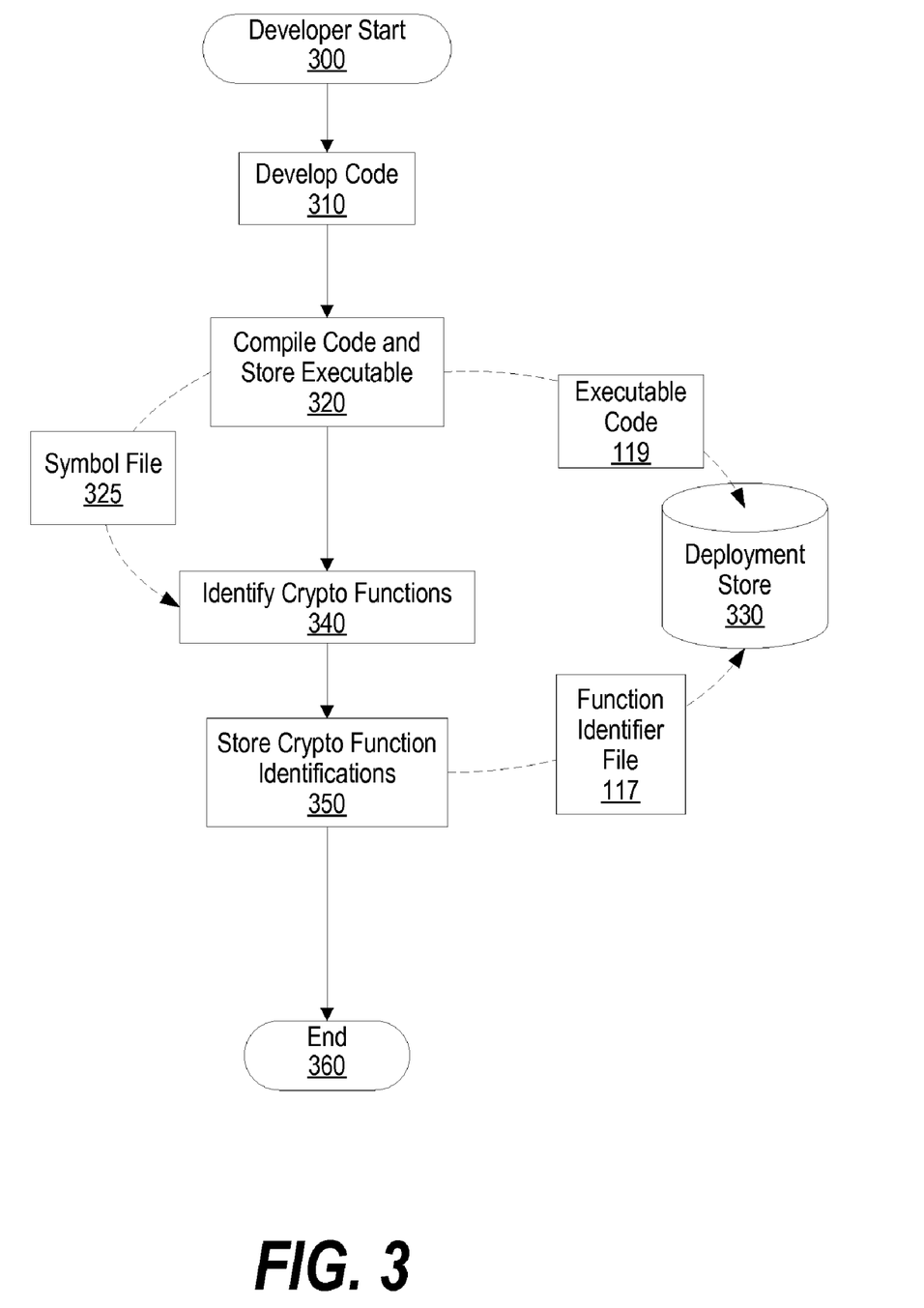
FIG. 3 is a flowchart showing steps taken in a developer developing application code and identifying cryptographic functions included in the application code.

FIG. 3 is a flowchart showing steps taken in a developer developing application code and identifying cryptographic functions included in the application code. Development processing commences at 300, whereupon a developer develops application program code at step 310. The developer may use a traditional programming language (C++), an object-based programming language (Java), or a model-based programming language (EMF).

Based upon the type of programming language that the developer uses, the developer compiles the code at step 320 and stores executable code 119 in deployment store 330. Executable code 119 is the same as that shown in FIG. 1. At step 340, the developer modifies symbol file 325 and identifies the functions that are cryptographic functions, such as by turning on a new flag that is added to the symbol file that identifies cryptographic functions. Processing stores the modified symbol file, which becomes function identifier file 117, in deployment store 330 at step 350. Function identifier file 117 is the same as that shown in FIG. 1. Processing ends at 360.

In one embodiment, a new keyword may be added to a programming language (i.e. Java, C++, C, Pascal, etc.), such as "CryptographicFunction," which may be used by the developer to identify cryptographic functions by adding the keyword as a qualifier to the function (i.e. either by prefixing the function or using the keyword as a specific "type," which is applied to the function). In this embodiment, when the application compiles, the compiler automatically generates the symbol file and identifies the cryptographic functions by the "CryptographicFunction" keyword. In this embodiment, when a processor loads the executable code, it also reads the symbol file and detects the functions that are identified as cryptographic functions.

In another embodiment, a developer adds a new keyword to the programming language. The difference between this embodiment and the previous embodiment is that instead of the compiler producing a separate symbol file, the cryptographic function identification is incorporated into the executable file itself. This eliminates the need for a separate symbol file. In this embodiment, when the processor loads the executable code, it detects that the compiler added a qualifier to the functions that are identified as cryptographic functions and implements the smoothing to those functions.

In yet another embodiment, in the case of compiled byte code, such as Java, the byte code includes symbol information. In this embodiment, a Java Virtual Machine (JVM) is positioned between the byte code and the processor, which performs further compilations from the Java byte code into the native OS machine code that a processor executes. In this embodiment, the JVM retrieves the cryptographic function identification information included in the byte code and passes the information to the processor during the JVM's byte code compilation.

Figure 4:
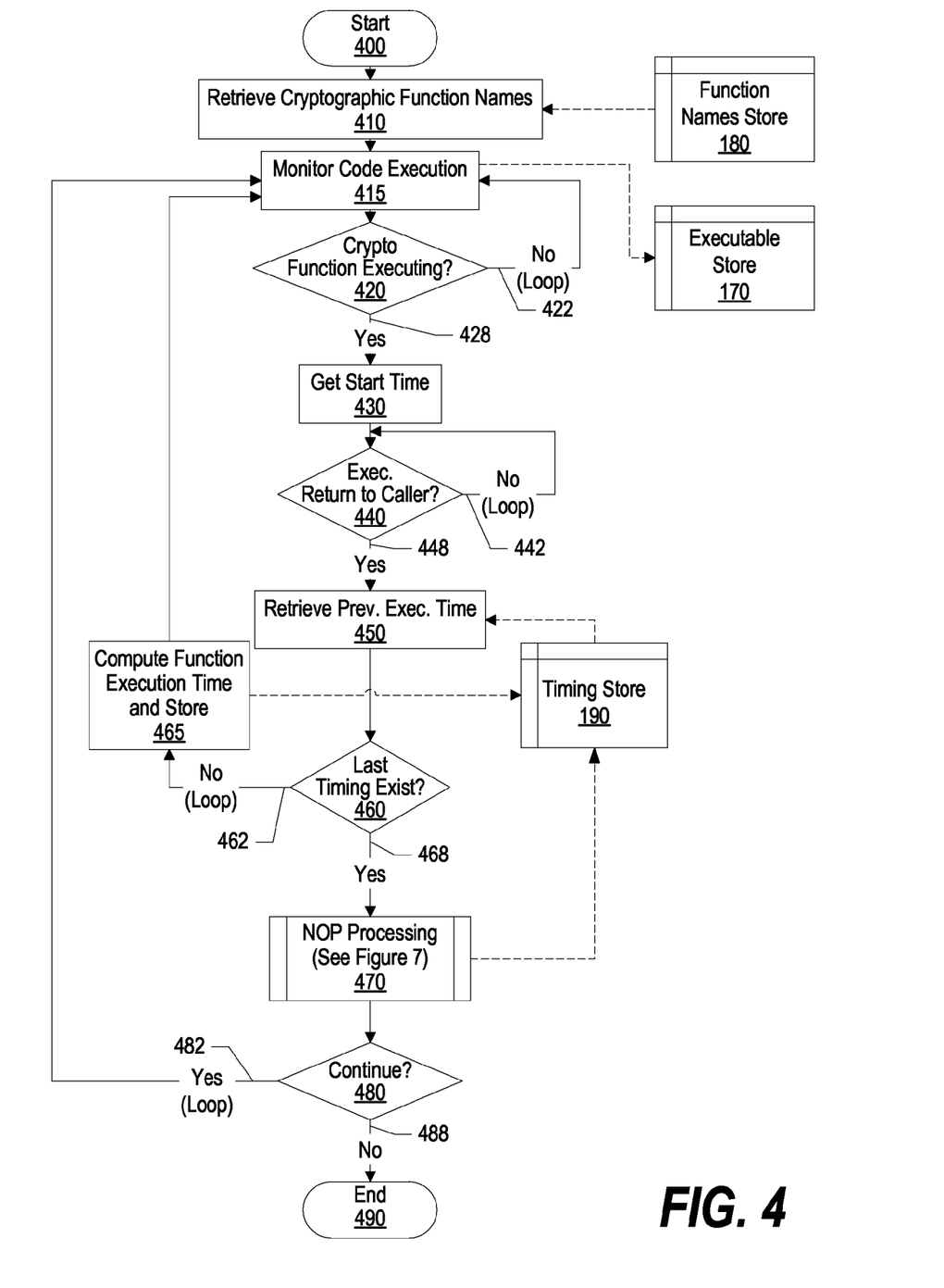
FIG. 4 is a flowchart showing steps taken in a function timing smoother identifying cryptographic functions and "smoothing" their respective timing durations.

FIG. 4 is a flowchart showing steps taken in a function timing smoother identifying cryptographic functions and "smoothing" their respective timing durations. Processing commences at 400, whereupon processing retrieves cryptographic function names from function names store 180 at step 410. A program developer previously identified the cryptographic functions during application development, and provided the cryptographic names when deploying the application. In turn, the function names are loaded into function names store 180 when a processor loads the corresponding application in executable store 170 (see FIG. 3 and corresponding text for further details). Function names store 180 and executable store 170 are the same as that shown in FIG. 1. As one skilled in the art can appreciate, the invention described herein may be applied to smooth function execution times other than just cryptographic functions.

At step 415, processing monitors the function execution for instructions included in executable store 170. A determination is made as to whether a cryptographic function is ready to execute by comparing the functions that are ready to issue with the identified functions in function names store 180 (decision 420). If a cryptographic function is not executing, decision 420 branches to "No" branch 422, which loops back to continue to monitor the application code. This looping continues until a cryptographic function is ready to execute, at which point decision 420 branches to "Yes" branch 428.

At step 430, processing retrieves an execution start time that corresponds to a time at which the cryptographic function begins to execute. A determination is made as to whether the executable is returned to the caller (e.g. the cryptographic function is complete) (decision 440). If the executable has not returned to the caller, decision 440 branches to "No" branch 442 which loops back to continue to monitor the cryptographic function progress. This looping continues until the executable is returned to the caller, at which point decision 440 branches to "Yes" branch 448.

At step 450, processing checks whether a "previous execution time" exists in timing store 190 that corresponds to the same cryptographic function. The previous execution time is the cryptographic function's execution time during its previous execution. For example, function "encodeword" may have previously taken 10 ms to execute.

A determination is made as to whether the cryptographic function has previously executed by checking whether a corresponding previous execution time exists (decision 460). If a previous execution time does not exist, decision 460 branches to "No" branch 462, which loops back to compute a "current execution time" and store the current execution time in timing store 190 at step 465. The current execution time is computed by subtracting the cryptographic function's ending time from its starting time. In turn, processing loops back to continue to monitor code execution. This looping continues until the second pass of the same cryptographic function, at which point decision 460 branches to "Yes" branch 468 whereupon processing injects No Operation (NOP) equivalent instructions into the execution pipeline if required in order to increase the amount of execution time to complete the current cryptographic function, which smoothes out the cryptographic function's timing footprint (pre-defined process block 470, see FIG. 7 and corresponding text for further details).

A determination is made as to whether to continue processing (decision 480). If processing should continue, decision 480 branches to "Yes" branch 482 whereupon processing loops back to monitor code execution. This looping continues until processing should terminate, at which point decision 480 branches to "No" branch 488 whereupon processing ends at 490.

Figure 5:
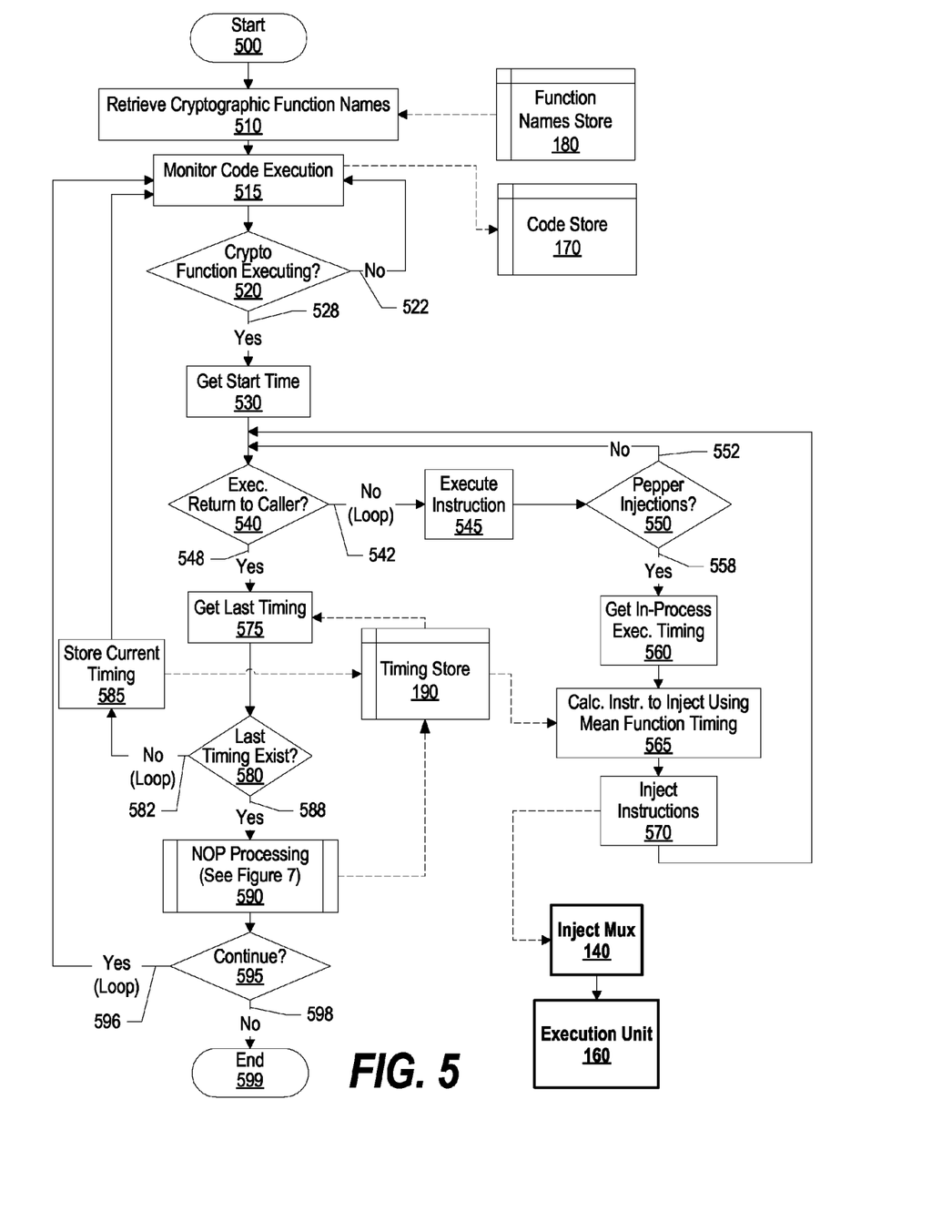
FIG. 5 is a flowchart showing steps taken in a function timing smoother injecting No Operation (NOP) instructions as well as random instructions in order to smooth cryptographic function timings.

FIG. 5 is a flowchart showing steps taken in a function timing smoother injecting No Operation (NOP) equivalent instructions as well as random instructions in order to smooth cryptographic function timings. FIG. 5 is similar to FIG. 4 with the exception that FIG. 5 includes steps to randomly insert filler instructions (e.g., NOP equivalent instructions) while a cryptographic function executes in order to increase the amount of execution time required to complete the function.

Processing commences at 500, whereupon steps 510 through 530 are the same as steps 410 through 430 shown in FIG. 4, respectively. Once processing identifies a cryptographic function executing and retrieves a start time, a determination is made as to whether the executable is returned to the caller (e.g. the cryptographic function has ended) (decision 540). If the executable has not returned to the caller, decision 540 branches to "No" branch 442 whereupon processing continues to allow the instruction to execute (step 545) and a determination is made as to whether to "pepper inject" filler instructions (decision 550). Meaning, instructions are randomly injected into an execution unit in order to increase a cryptographic function's current execution time at a more secure level.

If processing should not perform pepper injections, decision 550 branches to "No" branch 552 which loops back to monitor function execution. On the other hand, if processing should perform pepper injections, decision 550 branches to "Yes" branch 558 whereupon processing computes an in-process execution time at step 560 based upon the cryptographic function's start time and current time. At step 565, processing computes a mean function execution time based upon previous execution times (located in timing store 190), and calculates the number of instructions to inject based upon the mean function execution time. For example, the mean function execution time may be 12 ms and the in-process execution time is 7 ms. In this example, processing calculates that 5 ms worth of filler NOP instructions should be injected. Processing, at step 570, uses multiplexer 140 to inject instructions into execution 160. Multiplexer 140 and execution unit 160 are the same as that shown in FIG. 1.

When the cryptographic function ends, decision 540 branches to "Yes" branch 548 whereupon, at step 575, processing retrieves a previous execution time from timing store 190 that corresponds to the same cryptographic function. The previous execution time is the amount of time that the cryptographic function required the last time that it executed. For example, function "encodeword" may have taken 10 ms to execute the last time that the function executed.

A determination is made as to whether the cryptographic function has previously executed by checking whether a corresponding previous execution time exists (decision 580). If a previous execution time does not exist, decision 580 branches to "No" branch 582, which loops back to compute a current execution time and store the execution time in timing store 190 at step 585. The current execution time is computed by subtracting the cryptographic function's ending time from its starting time. In turn, processing loops back to continue to monitor code execution. This looping continues until a previous execution time exists (a cryptographic function's second time executing), at which point decision 580 branches to "Yes" branch 588 whereupon processing injects No Operation (NOP) equivalent instructions into the execution pipeline if required in order to increase the amount of execution time to complete the current cryptographic function (pre-defined process block 590, see FIG. 7 and corresponding text for further details).

A determination is made as to whether to continue processing (decision 595). If processing should continue, decision 595 branches to "Yes" branch 596 whereupon processing loops back to monitor code execution. This looping continues until processing should terminate, at which point decision 595 branches to "No" branch 598 whereupon processing ends at 599.

FIG. 6 is a flowchart showing steps taken in a function timing smoother injecting NOP equivalent instructions and adjusting clock speed in order to smooth cryptographic function timings. FIG. 6 is similar to FIGS. 4 and 5 with the exception that FIG. 6 includes steps to adjust an execution unit's clock timing while a cryptographic function executes in order to increase the amount of execution time required to complete the function.

Processing commences at 600, whereupon steps 610 through 630 are the same as steps 410 through 430 shown in FIG. 4, respectively. Once processing identifies a cryptographic function executing and retrieves a start time, a determination is made as to whether the executable is returned to the caller (e.g. the cryptographic function has ended) (decision 640). If the executable has not returned to the caller, decision 640 branches to "No" branch 642 whereupon processing continues to allow the instruction to execute (step 645) and a determination is made as to whether to vary an execution unit's timing (decision 650).

If processing should not vary the execution unit's timing, decision 650 branches to "No" branch 652 which loops back to monitor instruction execution. On the other hand, if processing should vary the execution unit's timing, decision 650 branches to "Yes" branch 658 whereupon processing computes an in-process execution time at step 660. At step 665, processing adjusts execution unit 160's timing using clock multiplexer 155 based upon the cryptographic function's mean function execution time (see FIG. 5 and corresponding text for further details). In one embodiment, in addition to varying the clock speed, processing may also "pepper inject" instructions (discussed in FIG. 5) in order to add another level of security. Clock multiplexer 155 and execution unit 160 are the same as that shown in FIG. 1.

When the cryptographic function ends, decision 640 branches to "Yes" branch 648 whereupon, at step 670, processing resets execution unit 160's clock timing. At step 675, processing retrieves a previous execution time from timing store 190 that corresponds to the same cryptographic function. The previous execution time is the amount of time that the cryptographic function required the last time that it executed. For example, function "encodeword" may have taken 10 ms to execute the last time that the function executed.

A determination is made as to whether the cryptographic function has previously executed by checking whether a corresponding previous execution time exists (decision 680). If a previous execution time does not exist, decision 680 branches to "No" branch 682, which loops back to compute a current execution time and store the execution time in timing store 190 at step 686. The current execution time is computed by subtracting the cryptographic function's ending time from its starting time. In turn, processing loops back to continue to monitor code execution. This looping continues until the cryptographic function's second execution, at which point decision 680 branches to "Yes" branch 688 whereupon processing injects No Operation (NOP) equivalent instructions into the execution pipeline, which increases the amount of execution time to complete the current cryptographic function (pre-defined process block 690, see FIG. 7 and corresponding text for further details).

A determination is made as to whether to continue processing (decision 695). If processing should continue, decision 695 branches to "Yes" branch 696 whereupon processing loops back to monitor code execution. This looping continues until processing should terminate, at which point decision 695 branches to "No" branch 698 whereupon processing ends at 699.

Figure 7:
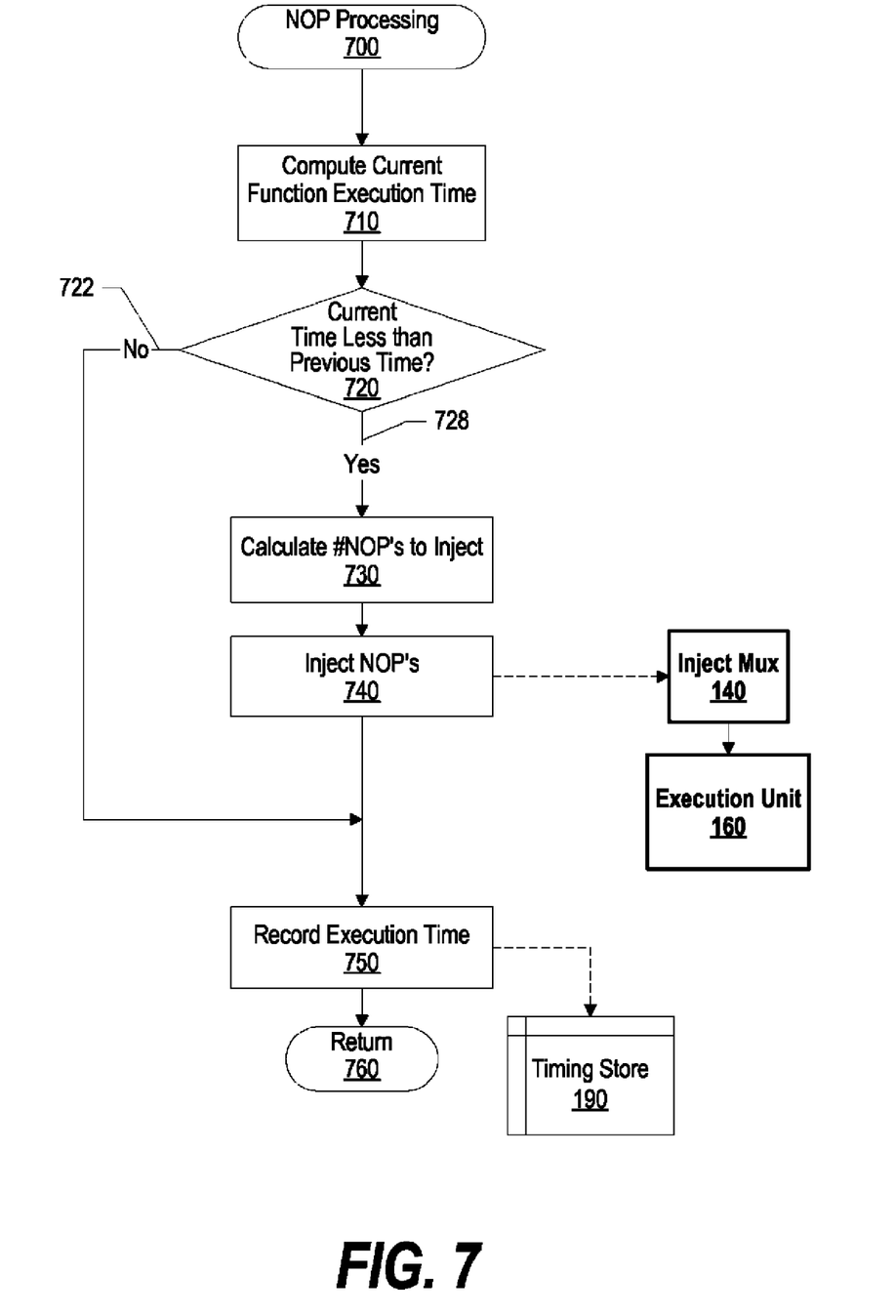
FIG. 7 is a flowchart showing steps taken in a function timing smoother injecting NOP instructions in order to smooth a cryptographic function's timing footprint.

FIG. 7 is a flowchart showing steps taken in a function timing smoother injecting NOP equivalent instructions in order to smooth a cryptographic function's timing footprint. Processing commences at 700, whereupon processing computes a current execution time (step 710). The current execution time is the amount of time that the current cryptographic function required to execute, such as 10 ms.

A determination is made as to whether the current execution time is less than a previous execution time, which was retrieved in FIG. 4, 5, or 6 (decision 720).

The previous execution time is the amount of time that the same cryptographic function took to execute the last time that it executed. For example, if the previous execution time was 9 ms and the current execution time is 10 ms, the current execution time is not less than the previous execution time. If the current execution time is not less than the previous execution time, decision 720 branches to "No" branch 722, bypassing NOP injection steps.

On the other hand, if the current execution time is less than the previous execution time, decision 720 branches to "Yes" branch 728 whereupon processing calculates the number of NOP's to inject to execution unit in order to increase the cryptographic function's current execution time (step 730). For example, if the current execution time is 12 ms and the previous execution time is 15 ms, processing calculates the number of NOP equivalent instructions required to consume 3 ms (15 ms-12 ms).

At step 740, processing configures multiplexer 140 to receive NOP equivalent instructions and provide them to execution unit 160. By using multiplexer 140, processing does not modify the code space or a code pointer for the cryptographic function's application code.

Processing, at step 750, records the current execution time in timing store 190, which, if NOP's were injected, includes the function's execution time and the amount of time for the injected NOP's. This stored timing is used as the "previous execution time" the next time the cryptographic function executes. Processing returns at 760.

Figure 8:
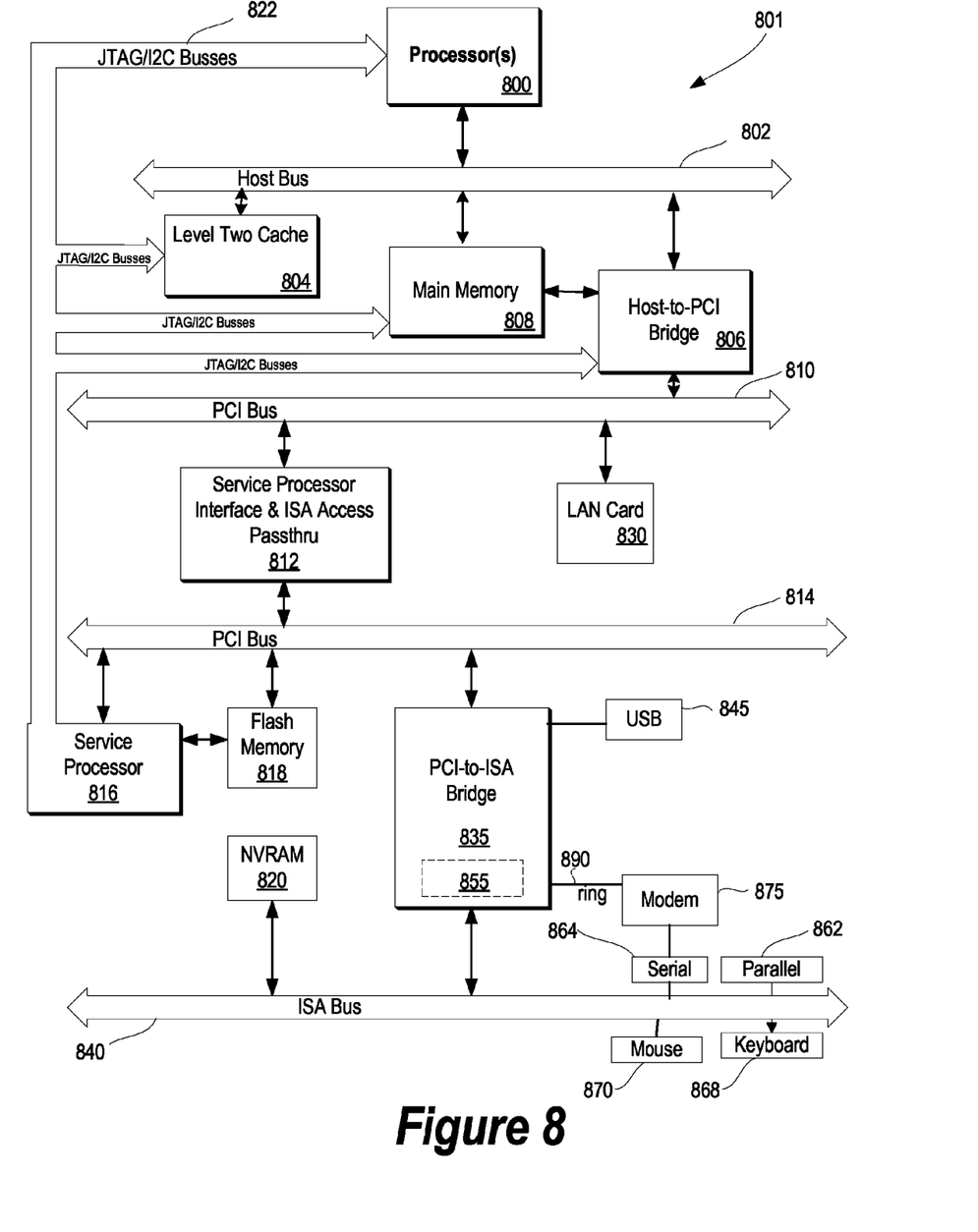
FIG. 8 is a block diagram of a computing device capable of implementing the present invention.

FIG. 8 illustrates information handling system 801 which is a simplified example of a computer system capable of performing the computing operations described herein.

Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 836 provides bus control to handle transfers between PCI bus 814 and ISA bus 840, universal serial bus (USB) functionality 846, power management functionality 866, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 886 is connected to serial port 864 and PCI-to-ISA Bridge 836.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
compiling a software program, the compiling resulting in an executable program;
automatically generating a function identifier file in response to compiling the software program, wherein the function identifier file identifies one or more cryptographic functions included in the executable program;
executing a function included in the executable program on an execution unit;
determining, based upon the function identifier file, that the executing function is one of the cryptographic functions;
in response to determining that the executing function is one of the cryptographic functions:
computing a current execution time that corresponds to the amount of time that the function requires to execute;
retrieving a previous execution time, the previous execution time corresponding to the amount of time that the function required during a previous execution;
determining that the current execution time is less than the previous execution time; and
in response determining that the current execution time is less than the previous execution time, injecting one or more filler instructions that do not correspond to the executable program, wherein the injecting increases the current execution time until the current execution time is equal to the previous execution time.

2. The method of claim 1 further comprising:
wherein code space corresponding to the executable program is not modified during the injecting; and
wherein a code pointer corresponding to the executable program is not modified during the injecting.

3. The method of claim 1 further comprising:
computing a mean function execution time using the previous execution time and one or more other previous execution times; and
adjusting a clock speed while the function is executing based upon the mean function execution time, wherein the adjusting results in the current execution time being equal to or greater than the previous execution time.

4. The method of claim 1 further comprising:
computing a mean function execution time using the previous execution time and one or more other previous execution times; and
injecting the filler instructions while the function is executing based upon the mean execution time.

5. The method of claim 1 wherein the method is performed during advanced encryption standard processing.

6. A computer program product stored on a non-transitory tangible computer operable storage medium containing instructions for execution by a computer, which, when executed by the computer, cause the computer to implement a method for smoothing cryptographic function timing footprints, the method comprising:
compiling a software program, the compiling resulting in an executable program;
automatically generating a function identifier file in response to compiling the software program, wherein the function identifier file identifies one or more cryptographic functions included in the executable program;
executing a function included in the executable program on an execution unit;
determining, based upon the function identifier file, that the executing function is one of the cryptographic functions;
in response to determining that the executing function is one of the cryptographic functions:
computing a current execution time that corresponds to the amount of time that the function requires to execute;
retrieving a previous execution time, the previous execution time corresponding to the amount of time that the function required during a previous execution;
determining that the current execution time is less than the previous execution time; and
in response determining that the current execution time is less than the previous execution time, injecting one or more filler instructions that do not correspond to the executable program, wherein the injecting increases the current execution time until the current execution time is equal to the previous execution time.

7. The computer program product of claim 6 wherein code space corresponding to the executable program is not modified during the injecting; and
wherein a code pointer corresponding to the executable program is not modified during the injecting.

8. The computer program product of claim 6 wherein the method further comprises:
computing a mean function execution time using the previous execution time and one or more other previous execution times; and
adjusting a clock speed while the function is executing based upon the mean function execution time, wherein the adjusting results in the current execution time being equal to or greater than the previous execution time.

9. The computer program product of claim 6 wherein the method further comprises:
computing a mean function execution time using the previous execution time and one or more other previous execution times; and
injecting the filler instructions while the function is executing based upon the mean execution time.

10. The computer program product of claim 6 wherein the method is performed during advanced encryption standard processing.

11. An information handling system comprising:
    one or more processors;
    a memory accessible by the processors;
    one or more nonvolatile storage devices accessible by the processors; and
    a timing footprint smoothing tool for smoothing a cryptographic function's timing footprint, the timing footprint smoothing tool being effective to:
        compile a software program, the compiling resulting in an executable program;
        automatically generate a function identifier file in response to compiling the software program, wherein the function identifier file identifies one or more cryptographic functions included in the executable program;
        execute a function included in the executable program;
        determine, based upon the function identifier file, that the executing function is one of the cryptographic functions;
        in response to determining that the executing function is one of the cryptographic functions:
            compute a current execution time that corresponds to the amount of time that the function requires to execute;
            retrieve a previous execution time, the previous execution time corresponding to the amount of time that the function required during a previous execution;
            determine that the current execution time is less than the previous execution time; and
            in response determining that the current execution time is less than the previous execution time, injecting one or more filler instructions that do not correspond to the executable program, wherein the injecting increases the current execution time until the current execution time is equal to the previous execution time.

12. The information handling system of claim 11 wherein the timing footprint smoothing tool is further effective to:
    wherein code space corresponding to the executable program is not modified during the injecting; and
    wherein a code pointer corresponding to the executable program is not modified during the injecting.

13. The information handling system of claim 11 wherein the timing footprint smoothing tool is further effective to:
    compute a mean function execution time using the previous execution time and one or more other previous execution times; and
    adjust a clock speed while the function is executing based upon the mean function execution time, wherein the adjusting results in the current execution time being equal to or greater than the previous execution time.

14. The information handling system of claim 11 wherein the timing footprint smoothing tool is further effective to:
    compute a mean function execution time using the previous execution time and one or more other previous execution times; and
    inject the filler instructions while the function is executing based upon the mean execution time.

* * * * *